United States Patent [19]

Frost, Jr.

[11] Patent Number: 5,365,886
[45] Date of Patent: Nov. 22, 1994

[54] AQUARIUM CONTAIMENT SYSTEM

[76] Inventor: Robert W. Frost, Jr., 8600 Woodlake Dr., Haughton, La. 71037

[21] Appl. No.: 20,346

[22] Filed: Feb. 19, 1993

[51] Int. Cl.$^5$ ............................................. A01K 63/00
[52] U.S. Cl. .................................................. 119/267
[58] Field of Search ............. 119/247, 248, 249, 250, 119/245, 267, 266, 265, 269

[56] References Cited

U.S. PATENT DOCUMENTS

| | | | |
|---|---|---|---|
| D. 196,107 | 8/1963 | Schur | D7/451 |
| 3,121,417 | 2/1964 | Goldman et al. | 119/253 |
| 3,557,753 | 1/1971 | Dantoni | 119/2 |
| 3,730,138 | 5/1973 | Suchowski | 119/253 |
| 3,774,575 | 11/1973 | Patterson | 119/5 |
| 3,908,598 | 9/1975 | Jewson | 119/267 |
| 4,082,062 | 4/1978 | Rodemeyer | 119/5 |
| 4,365,590 | 12/1982 | Ruggieri et al. | 119/15 |
| 4,380,968 | 4/1983 | Renny | 119/5 |
| 4,606,821 | 8/1986 | D'Imperio | 210/169 |
| 4,684,462 | 8/1987 | Augustyniak | 210/97 |
| 4,773,008 | 9/1988 | Schroeder | 364/400 |
| 4,787,336 | 11/1988 | Lineberry | 119/5 |
| 5,042,425 | 8/1991 | Frost, Jr. | 119/5 |
| 5,167,445 | 12/1992 | Linnenkamp et al. | 362/101 |
| 5,197,409 | 3/1993 | Hammond | 119/245 X |

Primary Examiner—Gene Mancene
Assistant Examiner—Thomas Price
Attorney, Agent, or Firm—John M. Harrison

[57] ABSTRACT

An aquarium containment system for displaying marine life, which system includes an aquarium support or rack for displaying one or more aquariums or tanks having tinted background and/or bottom panels and containing fish and/or other marine life. The racks include strips of light-dispersing acrylic in selected colors and a system of fluorescent lights is provided in the aquarium rack to illuminate the light-dispersing acrylic strips and background panels and/or bottom panels and brighten the display. Multiple aquarium racks may be joined in an array, depending upon the number of aquariums desired for display and the racks are provided with sliding closures to access the fluorescent lights and aquariums.

25 Claims, 2 Drawing Sheets

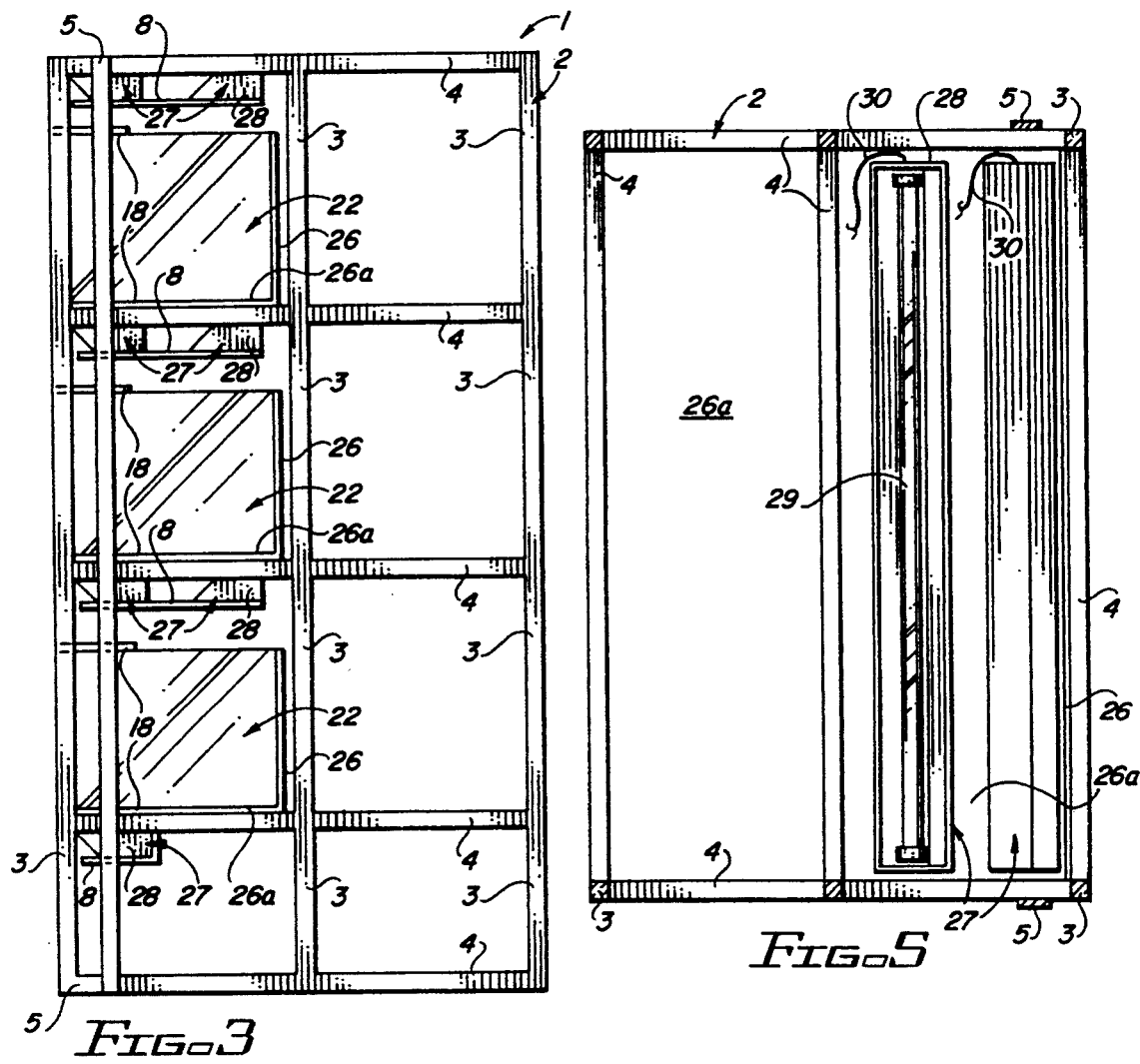
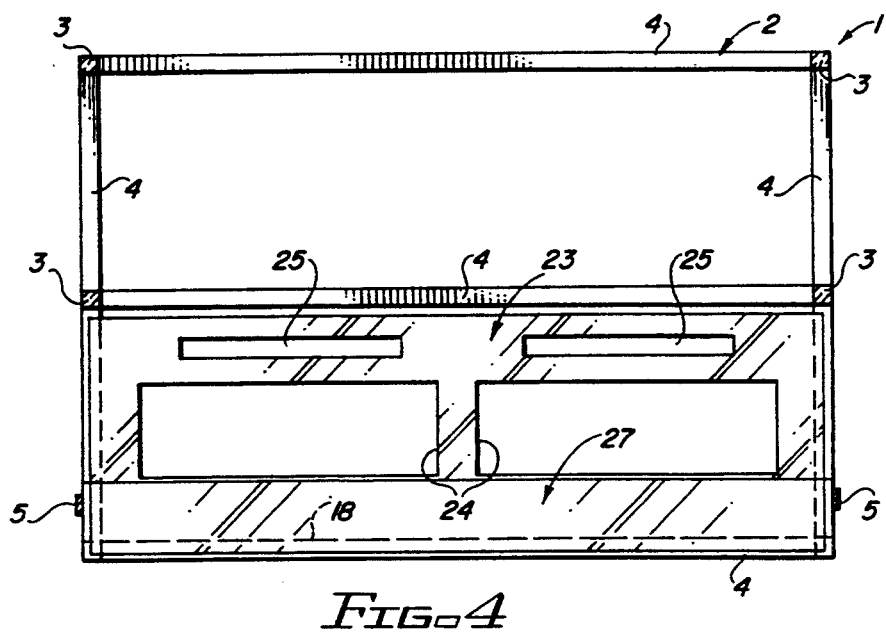

AQUARIUM CONTAIMENT SYSTEM

BACKGROUND OF THE INVENTION

1. Field of the Invention

This invention relates to display systems for aquariums and more particularly, to an aquarium containment system which includes in a first preferred embodiment one or more aquarium supports or racks for supporting multiple stacked sets of aquariums or tanks having tinted background accent and/or bottom accent panels and containing marine life. Each rack is provided with a removable lighting system and strips of light-dispersing acrylic to brighten and highlight the display. An automatic water distribution system is provided for the aquariums with mechanical and biological filtration systems and heaters for maintaining the marine life in a comfortable environment. A drain system is also provided for draining the aquariums, as well as an electrical system for servicing the various mechanical accessories, including providing power to the various pumps, heaters and lights in the system. Sliding access panels facilitate access to the tops of the aquariums and the lighting system for maintenance and cleaning purposes.

Among the problems realized in displaying marine life such as fish, in aquariums located in pet shops and stores having pet departments, is that of maintaining the aquariums at the desired temperature and cleanliness to insure the health of the marine life and also displaying the aquariums in an attractive, sales-conducive environment which also facilitates easy aquarium access, to quickly and easily remove marine life and maintain the aquariums on a periodic basis.

2. Description of the Prior Art

My U.S. Pat. No. 5,042,425, dated Aug. 27, 1991, details an "Aquarium and Bird and Animal Containment System" for solving the problem of insuring the health of marine life in the aquariums and providing an esthetically-pleasing appearance to the viewer and customer. Various other types of aquariums for maintaining fish and other marine life in a healthy condition are known in the art. Typical of these aquariums is the "Aquatic Chamber" of U.S. Pat. No. 3,557,753, dated Jan. 26, 1971, to Joseph L. Dantoni. The chamber includes a filter and means for circulating water, as well as heating and cooling capabilities. An "Aquarium" is detailed in U.S. Pat. No. 3,774,575, dated Nov. 27, 1973, to Carol M. Patterson. The aquarium includes a frame, a tray having an aquarium compartment slidably mounted with the frame and a device for positioning and maintaining the tray and aquarium compartment in a horizontal disposition when the tray is pulled outwardly of the frame. An "Integrated Aquarium" is detailed in U.S. Pat. No. 4,082,062, dated Apr. 4, 1978, to Donald J. Rodemeyer. The integrated aquarium includes all of the necessary aquarium mechanical functions, including an air pump, lighting and heating located in a compartment provided as a part of the aquarium base. Those components which are particularly subject to mechanical failure are mounted in a slide-out drawer provided as part of the base, for easy access. The preferred embodiment includes an especially pleasing, esthetic, hexagonal design which includes a thin, unobstructive cover. U.S. Pat. No. 4,380,968 dated Apr. 26, 1983, to Arthur B. Renny, entitled "Art of Exhibiting Fish", includes a vertical aquarium consisting of a transparent fish tank and a metal cowl. The aquarium requires the usual accessories for proper operation and stands vertically, having a height greater than its width or depth. The cowl also stands vertically and has a height, width and depth which are greater than that of the aquarium and is designed to silence, at least in part, the noise from the operation of the aquarium. U.S. Pat. No. 4,606,821, dated Aug. 19, 1986, to David D'Imperio details a "Sectionalized Integrated Aquarium". The aquarium is formed by two interlocking U-shaped members and the area thus formed is divided into two compartments, an aquarium compartment and a mechanical filtering chamber. The filtering chamber contains filters and a reservoir and the aquarium compartment contains a bottom filter. The sections are divided by a vertical wall which has internal plumbing members and serves as a conduit, as well as a divider. Water enters the aquarium section from the reservoir through the vertical panel and piping and is released from the aquarium compartment to the mechanical filtering chamber by waterfall action through slots in the upper part of the vertical panel. Water is constantly circulated between the sections and is continuously aerated and filtered. U.S. Pat. No. 4,684,462, dated Aug. 4, 1987, to George E. Augustyniak, details a "Filtration, Aeration and Water Level Control Means For Aquariums". The control device is portable and universally adaptable for use in conjunction with any conventional aquarium and for incorporation into the recirculation, water filtration and aeration system thereof. The device is designed to automatically maintain a predetermined level of water in an aquarium tank and continually remove water solely from the top surface of the water-containing aquarium tank and filter and aerate the same when in operation. The water control device is adapted to be supported on the wall of an aquarium tank and includes an open-top overflow receptacle positioned within the aquarium tank and an open-top prefilter receptacle positioned externally of the aquarium tank. The tank has an interior divided into a water-receiving department and a drainage compartment by a vertical petition wall and a siphon tube for transferring water from the bottom of the overflow receptacle to the bottom of the water-receiving chamber is also provided. The siphon tube has both of its ends at the same level, which level is below the level of the top edge of the prefilter receptacle petition wall, the overflow of prefilter receptacle having a water aeration system embodied therein and each receptacle may also have a filtration means incorporated therein. U.S. Pat. No. 4,773,008, dated Sep. 20, 1988, to R. L. Schroeder, et al, details an "Environmental Control Of An Aquarium". The device includes apparatus for controlling the environment of a tank adapted to be filled with water, where the tank includes multiple control apparatus. The invention utilizes a microprocessor having multiple control signal inputs and outputs and the apparatus is provided for coupling each of the control signal outputs to each of the control apparatus. A program device is coupled to the microprocessor signal input, such that the data can be entered for the control of each of the multiple control signal outputs. Moreover, a timing apparatus is likewise coupled to one of the plurality of signal inputs to allow the microprocessor to calculate time of day, such that data entered by the program device will selectively control the function of each of the control apparatus as necessary to maintain the environment within the limits set by the operator. U.S. Pat. No. 4,787,336, dated Nov. 29, 1988, to W. Scott Lineberry, details a "Controlled Environment Habitat For Aquariums". The habitat includes a transparent housing having top, bottom and sidewalls containing plant or animal life which is submerged in an aquarium. A forced air pump is connected by a tubular conduit to the housing for introducing air into the housing. Perforations in one wall provide means for passing air out of the house and, when air pressure is reduced, permits water to flow into the habitat to provide nourishment to the life contained therein. A "Cabinet, Aquarium and Animal Cage Unit for Biology Classrooms or the Like" is illustrated in U.S. Pat. No. Des. 196,107.

It is an object of this invention to provide an aquarium containment system which is characterized in a first preferred embodiment by an aquarium support or rack containing at least one or multiple tanks or aquariums fitted with strips of light-dispersing acrylic material and a lighting system for illuminating the light-dispersing acrylic material.

Another object of this invention is to provide an aquarium containment system which is compact, easily accessible and locates multiple heated, aerated and filtered aquariums or tanks in easily viewable areas mounted on one or more aquarium supports or racks having light-dispersing acrylic provided therein and a lighting system for illuminating the light-dispersing acrylic and the aquariums.

Still another object of this invention is to provide an easily viewable and maintained aquarium containment system, which system includes one or more aquarium supports or racks for supporting multiple aquariums having tinted background and/or bottom panels in an easily viewable position, which racks are fitted with a removable lighting system and strips of light-dispersing acrylic material of selected color for highlighting the aquariums and the racks in an esthetically-pleasing manner.

A still further object of this invention is to provide an aquarium containment system which includes aquarium supports or racks joined in an array and fitted with multiple, stacked aquariums having tinted bottom and/or background accent panels and located in sets, which racks are also fitted with strips of light-dispersing acrylic of selected color and a removable lighting system accessed by sliding doors, for highlighting the aquariums and the light-dispersing acrylic in an esthetically-pleasing manner.

SUMMARY OF THE INVENTION

These and other objects of the invention are provided in an aquarium containment system which in a most preferred embodiment includes a set of side-by-side, connected upright cabinets or racks adapted to receive and display multiple stacked sets of aquariums or tanks for containing marine life, with tinted background and bottom panels provided in the aquariums, along with complete water and air systems for aerating, filtering and heating the water in the aquariums and a drain system for draining the aquariums, the racks further provided with multiple light-dispersing acrylic strips of selected color and a removable fluorescent lighting system accessed by sliding doors for illuminating the light-dispensing acrylic strips and highlighting the aquariums, marine life and aquarium supports or racks in an esthetically-pleasing manner.

BRIEF DESCRIPTION OF THE DRAWINGS

The invention will be better understood by reference to the accompanying drawings, wherein:

FIG. 3 is a sectional view taken along line 3—3 of the aquarium containment system illustrated in FIG. 2;

FIG. 4 is a sectional view taken along line 4—4 of the aquarium containment system illustrated in FIG. 2;

FIG. 5 is a sectional view taken along line 5—5 of the aquarium containment system illustrated in FIG. 2.

DESCRIPTION OF THE PREFERRED EMBODIMENTS

Figures 1, 6:
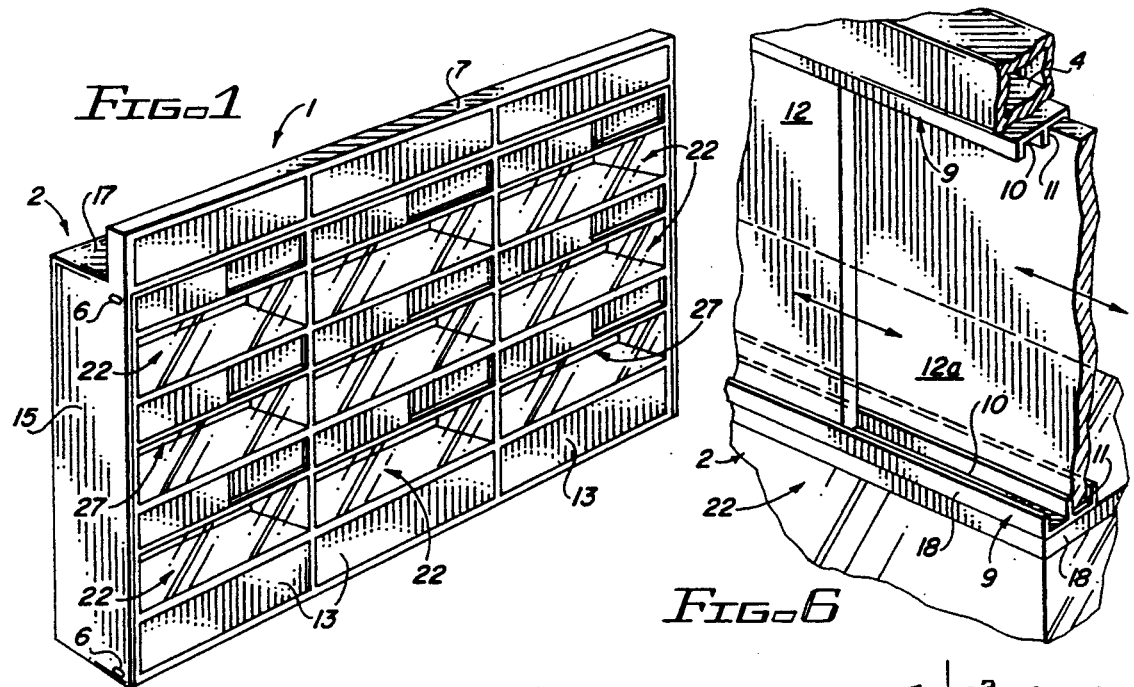
FIG. 1 is a perspective view of three units of the aquarium containment system joined together.
FIG. 6 is a perspective view partially in section, of a pair of sliding panels provided in the aquarium containment system.
Figure 2:
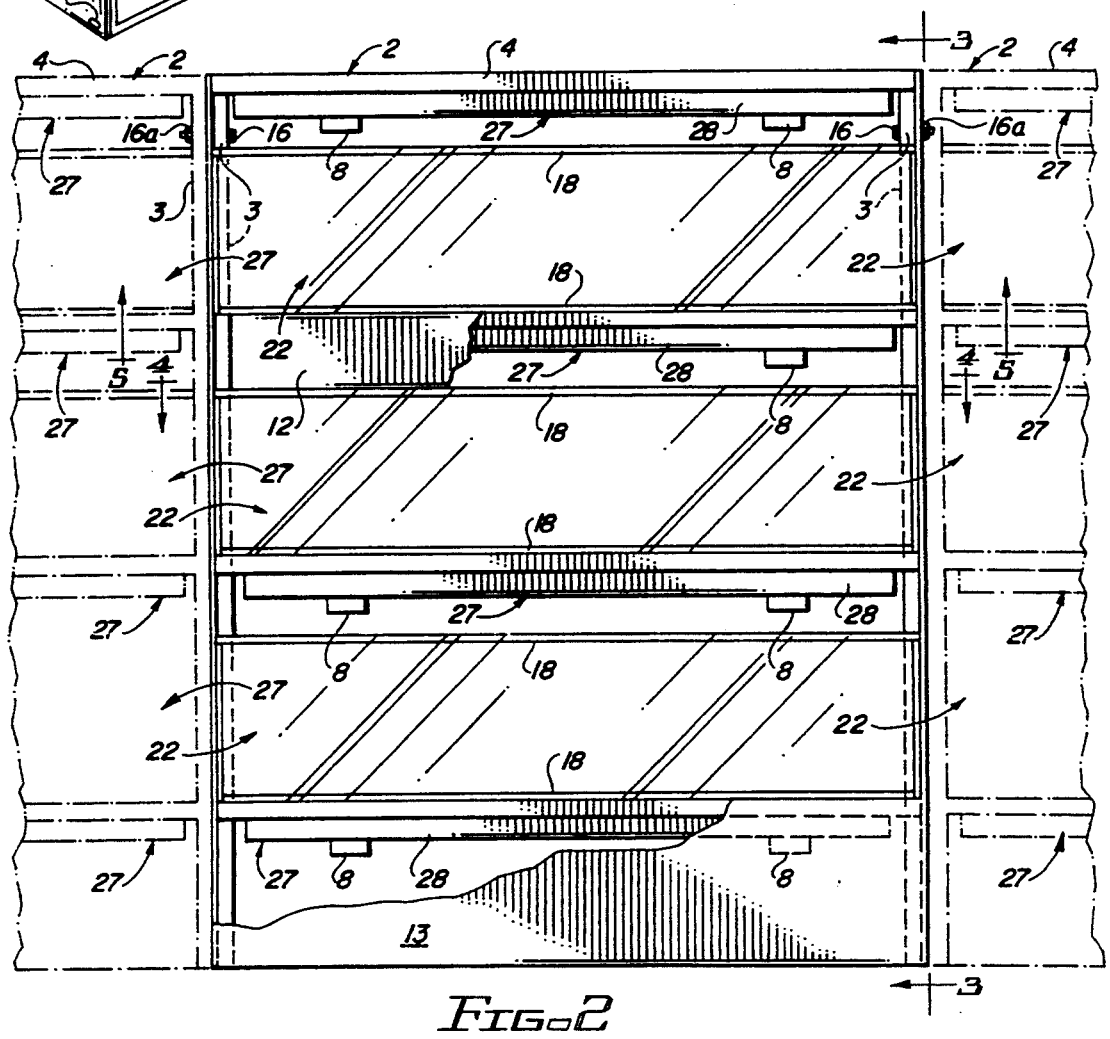
FIG. 2 is a front elevation of the center unit illustrated in FIG. 1.

Referring initially to FIGS. 1-3 of the drawings, the aquarium containment system of this invention is generally illustrated by reference numeral 1. The aquarium containment system 1 includes a frame 2 which is constructed of multiple vertical frame members 3 and horizontal frame members 4, preferably welded together for maximum strength, and topped by an optional internally-lighted marquee 7. However, it will be appreciated by those skilled in the art that the vertical frame members 3 and horizontal frame members 4 may be bolted or otherwise constructed, according to the knowledge of those skilled in the art. In a most preferred embodiment of the invention parallel vertical straps or braces 5 span both sides of the frame 2 from top to bottom and are welded to companion horizontal frame members 4, to provide additional stiffening and support for the three stacked aquariums 22 which are supported on the respective sets of horizontal frame members 4, as illustrated. It will be further appreciated by those skilled in the art that the weight of water located in the aquariums 22 serves to further stabilize the frame 2 and provide a sturdy, stable aquarium containment system 1. Multiple oval openings 6 are provided at the top and bottom of the top side elements of the respective horizontal frame members 4 for the purpose of attaching multiple units of the frame 2 together in an array and aligning the oval openings 6 to accommodate panel bolts 16, secured by nuts 16a, as illustrated in FIGS. 1 and 2. In this manner, multiple units of the aquarium containment system 1 may be joined in side-by-side fashion as illustrated in FIG. 1, to construct a display having a selected number of aquariums 22 which will accommodate the desired number and variation of marine life anticipated for sale. A pair of spaced, L-shaped light brackets 8 are welded or otherwise attached to each level of the respective horizontal frame members 4 as illustrated in FIGS. 2 and 3, to accommodate multiple fluorescent light fixtures 27, each characterized by a light frame 28 having one or more fluorescent bulbs 29. A light cord 30 serves each light fixture 27. Referring to FIG. 3, in a most preferred embodiment of the invention a pair of light fixtures 27 are provided on spaced light brackets 8 mounted on the frame 2 above the top one of the aquariums 22, with the fluorescent bulbs 29 of both light fixtures 27 facing downwardly to highlight the top one of the aquariums 22. A pair of light fixtures 27 is also mounted on a second set of spaced light brackets 8 located beneath the top one of the aquariums 22 and above the second one of the aquariums 22, with one of the sets of fluorescent bulbs 29 facing upwardly to highlight the bottom of the top one of the aquariums 22 and the other facing downwardly to highlight the top of the second one of the aquariums 22. Still another set of light brackets 8 are provided on a third set of spaced light brackets 8 located above the third one of the aquariums 22 and beneath the second one of the aquariums 22 for receiving a pair of light fixtures 27 which are arranged in the same manner as the previously described light fixtures 27, with one set of fluorescent bulbs 29 facing upwardly and the other set facing downwardly. A single light fixture 27 is preferably mounted beneath the bottom one of the aquariums 22, with the fluorescent bulbs 29 facing upwardly to highlight the bottom of the bottom one of the aquariums 22.

Referring now to FIGS. 2–6 of the drawings, in another preferred embodiment of the invention an aquarium access panel 23 is mounted on the top of each of the aquariums 22 and is fitted with panel openings 24 and panel slots 25 for accessing marine life placed in the aquariums 22. Furthermore, a tinted bottom accent panel 26a and a tinted background accent panel 26 of selected color, preferably blue or green, form the bottom and back surfaces, respectively, of each of the aquariums 22, in order to accentuate the light from the respective light fixtures 27 and highlight the marine life in the aquariums 22. Accordingly, in a most preferred embodiment of the invention the aquariums 22 are constructed of clear plastic or glass and the respective tinted bottom accent panels 26a and background accent panels 26 are applied by glue, bolts or otherwise mounted only to the bottom and rear panels of the aquariums 22 for highlighting purposes.

In yet another preferred embodiment of the invention, light-dispensing acrylic panels 18 are provided along the top front edge, as well as along the bottom front edge of each of the aquariums 22, for dispersing light received from the fluorescent bulbs 29 in the light frames 28 of the respective light fixtures 27. This light also highlights the tinted bottom accent panel 26a and tinted background accent panel 26 of each of the aquariums 22 as it illuminates the acrylic panels 18 to provide an esthetically-pleasing display of the aquariums 22 in each of the respective frames 2. Since the acrylic panels 18 are tinted, light is scattered through the acrylic panels 18, causing them to glow in the tinted color and provide an unusually attractive and esthetically- pleasing display for the aquarium containment system 1.

In still another preferred embodiment of the invention, and referring to FIGS. 1 and 6, a pair of parallel closure panel tracks 9 are glued or otherwise mounted on each of the front acrylic panels 18 located at the top front of the respective aquariums 22 and a like closure panel track 9 is likewise attached to the appropriate corresponding horizontal frame members 4 located directly above the bottom closure panel track 9 and in vertical alignment therewith. Each of the closure panel tracks 9 includes a front panel slot 10 and a rear panel slot 11, disposed in closely, spaced, parallel relationship, for receiving a front closure panel 12 and cooperating rear closure panel 12a, respectively, as illustrated. It will be appreciated by those skilled in the art that the aquariums 22 and corresponding aquarium access panels 23 can be accessed by sliding the front closure panel 12 and rear closure panel 12a to the left or right in the respective front panel slot 10 and rear panel slot 11, for the purpose of inserting or removing marine life (not illustrated)into and from the respective aquariums 22.

As further illustrated in FIG. 1, a front frame panel 13 is mounted by means of panel magnets or fasteners (not illustrated) to the lower front of the frame 2 in order to quickly and easily access various equipment, such as heaters, filters, drain lines, water lines and the like (not illustrated) mounted on the frame 2 for operating the aquariums 22. Side frame panels 15 are likewise bolted or otherwise attached to the sides of each frame 2 for closing the sides of the frame 2 and a top frame panel 17 is bolted or otherwise attached to the top of the frame 2 behind the marquee 7, for closing the top of the frame 2. Panel bolts 16 may typically be used to attach the side frame panels 15 and top frame panels 17 to the frame 2, as well as to secure the respective frames 2 together in an array, as illustrated in FIG. 2.

It will be appreciated by those skilled in the art that the aquarium containment system I of this invention may be installed in any desired pet shop or store where marine life is sold or displayed. Multiple units of the frame 2 can be joined using panel bolts 16 inserted through the respective aligned oval openings 16 located in adjacent horizontal frame members 4 and secured by nuts 16a. Furthermore, the desired number of aquariums 22 can be placed on the aligned units of the frame 2 and highlighted using the respective light fixtures 27, which illuminate the tinted acrylic panels 18 and the respective tinted bottom accent panel 26a and background accent panel 26, provided on each of the aquariums 22. It is understood that, depending upon the extent of color enhancement desired in the aquariums 22, either or both of the tinted bottom access panels 26a and background accent panels 26 may be used on the aquariums 22. Furthermore, the degree and color of tint in these panels, as well as in the acrylic strips 18, can be controlled, as well as the intensity and number of fluorescent bulbs 29, to achieve the desired illuminating effect in the aquarium containment system 1. The aquarium containment system 1 is therefore illuminated in a most unusual, yet esthetically-pleasing manner to provide a warm glow which attracts customers and viewers.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. An aquarium containment system comprising a frame; at least two aquariums supported by said frame; at least one strip of light-dispersing material contacting each one of said aquariums; and a top light mounted on said frame above said aquariums for illuminating the top of said aquariums; a pair of lights mounted on said frame between each of said aquariums, with a first one of said pair of lights illuminating the bottom of said aquariums and a second one of said lights illuminating the top of said aquariums; and a bottom light mounted on said frame below said aquariums for illuminating the bottom of said aquariums.

2. The aquarium containment system of claim 1 wherein said frame comprises vertical frame members and horizontal frame members welded to said vertical frame members, side panels connected to opposite sides of said vertical frame members and a front frame panel connected to the front of said vertical frame members at the bottom of said frame.

3. The aquarium containment system of claim 1 comprising at least one pair of closure panels slidably carried by said frame above said aquariums for accessing said top light, said pair of lights and said bottom light and said aquariums.

4. The aquarium containment system of claim 3 wherein said at least two aquariums comprises a plurality of aquariums arranged in stacked relationship in said frame and said at least one pair of closure panels comprises a separate set of closure panels slidably carried by said frame above each of said aquariums, respectively.

5. The aquarium containment system of claim 4 wherein said frame comprises vertical frame members and horizontal frame members welded to said vertical frame members, side panels connected to opposite sides of said vertical frame members and a front frame panel connected to the front of said vertical frame members at the bottom of said frame.

6. The aquarium containment system of claim 1 further comprising light bracket means carried by said frame for supporting said top light, said pair of lights and said bottom light in said frame.

7. The aquarium containment system of claim 6 wherein said at least two aquariums comprises a plurality of aquariums arranged in stacked relationship in said frame.

8. The aquarium containment system of claim 7 comprising a pair of closure panels slidably carried by said frame above each of said aquariums for accessing said top light, said pair of lights and said bottom light and said aquariums.

9. The aquarium containment system of claim 1 wherein said at least one strip of light-dispersing material comprises a top strip of acrylic extending across the top front edge of said aquariums and a bottom strip of acrylic extending across the bottom front edge of said aquarium.

10. The aquarium containment system of claim 9 wherein said at least two aquariums comprises a plurality of aquariums arranged in stacked relationship in said frame.

11. The aquarium containment system of claim 10 comprising a pair of closure panels slidably carried by said frame above each of said aquariums for accessing said top lights and said aquariums.

12. The aquarium containment system of claim 11 further comprising light bracket means carried by said frame for supporting said top light, said pair of lights and said bottom light in said frame.

13. The aquarium containment system of claim 12 wherein said frame comprises a plurality of vertical frame members and a plurality of horizontal frame members welded to said vertical frame members, side panels connected to opposite sides of said vertical frame members, a front frame panel connected to the front of said vertical frame members at the bottom of said frame and a marquee provided on the top of said frame for highlighting said frame.

14. The aquarium containment system of claim 1 comprising a tinted background accent panel provided on the back wall of each of said aquariums for simulated tinting of the water in said aquariums responsive to illumination of said tinted background accent panel by said light means.

15. The aquarium containment system of claim 1 comprising at least one tinted accent panel means provided on each of said aquariums for simulated tinting of the water in said aquariums responsive to illumination of said tinted accent panel means by said top lights, said pair of lights and said bottom light.

16. The aquarium containment system of claim 15 wherein said at least one tinted access panel means comprises:
(a) a tinted background accent panel provided on the back wall of each of said aquariums; and
(b) a tinted bottom accent panel provided on the bottom of each of said aquariums.

17. The aquarium containment system of claim 16 wherein said at least one strip of light-dispersing material comprises a top strip of acrylic extending across the top front edge of said aquarium and a bottom strip of each of acrylic extending across the bottom front edge of each of said aquariums.

18. The aquarium containment system of claim 17 wherein said at least two aquariums comprises three aquariums arranged in stacked relationship in said frame.

19. The aquarium containment system of claim 18 comprising a pair of closure panels slidably carried by said frame above each of said aquariums for accessing said top lights said pair of lights and said bottom light and said aquariums.

20. The aquarium containment system of claim 19 wherein said frame comprises a plurality of vertical frame members and a plurality of horizontal frame members welded to said vertical frame members, side panels connected to opposite sides of said vertical frame members and a front frame panel connected to the front of said vertical frame members at the bottom of said frame.

21. An aquarium containment system comprising a frame; a plurality of aquariums supported by said frame in stacked relationship; a plurality of lights provided in said frame for illuminating the top and bottom of each of said aquariums, respectively; and at least one strip of light-dispersing acrylic provided on each of said aquariums, whereby said light-dispersing acrylic is illuminated by said lights.

22. The aquarium containment system of claim 21 comprising a pair of closure panels slidably carried by said frame above each of said aquariums for accessing said aquariums and said lights.

23. The aquarium containment system of claim 22 comprising a pair of light brackets carried by said frame for supporting each of said lights.

24. The aquarium containment system of claim 23 wherein said plurality of aquariums comprise three aquariums and said lights comprise a top light mounted on said frame above said aquariums for illuminating the top of the top one of said aquariums; a pair of lights mounted on said frame between each of said aquariums, with a first one of said pair of lights illuminating the bottom of said aquariums and a second one of said lights illuminating the top of said aquariums; and a bottom light mounted on said frame below said aquariums for illuminating the bottom of the bottom one of said aquariums.

25. An aquarium containment system comprising a welded frame; a plurality of aquariums supported by said frame in stacked relationship; a pair of light brackets disposed above and between each of said aquariums and a top light provided on said light brackets above the top one of said aquariums for illuminating the top one of said aquariums; a pair of lights provided on said light brackets between said aquariums, respectively, with a first one of said pair of lights illuminating the bottom of each of said aquariums and a second one of said pair of lights illuminating the top of each of said aquariums; a bottom light provided on said light brackets below said aquariums for illuminating the bottom of the bottom one of said aquariums; a top strip of tinted acrylic extending across the top front edge of each of said aquariums and a bottom strip of tinted acrylic extending across the bottom front edge of each of said aquariums; a tinted background panel provided on the back wall of each of said aquariums and a tinted bottom panel provided on the bottom of each of said aquariums; and a pair of closure panels slidably carried by said frame above each of said aquariums for accessing said lights and said aquariums, whereby said lights illuminate said top strip of tinted acrylic, said bottom strip of tinted acrylic, said tinted background panel and said tinted bottom panel for highlighting said aquariums.

* * * * *